United States Patent [19]

Austin et al.

[11] 4,067,349
[45] Jan. 10, 1978

[54] PACKER FOR TESTING AND GROUTING CONDUITS

[75] Inventors: Carl E. Austin; Ramon K. Hamilton; W. L. Qualls, all of Duncan, Okla.

[73] Assignee: Halliburton Company, Duncan, Okla.

[21] Appl. No.: 742,147

[22] Filed: Nov. 15, 1976

[51] Int. Cl.² .................... F16L 55/18; G01M 3/28
[52] U.S. Cl. .................................. 138/97; 73/40.5 R
[58] Field of Search .................. 73/40.5, 395, 407; 138/97, 98

[56] References Cited

U.S. PATENT DOCUMENTS

| | | | |
|---|---|---|---|
| 1,849,139 | 3/1932 | Dawkins | 73/395 |
| 3,103,235 | 9/1963 | Stringham | 138/97 |
| 3,163,529 | 12/1964 | Jewett | 73/406 |
| 3,168,908 | 2/1965 | Zurbrigen et al. | 138/97 |
| 3,168,909 | 2/1965 | Zurbrigen et al. | 138/97 |
| 3,269,421 | 8/1966 | Telford | 138/97 |
| 3,750,711 | 8/1973 | Conklin | 73/40.5 |
| 3,885,091 | 5/1975 | Fish et al. | 178/6 |
| 3,943,410 | 3/1976 | Kalberer | 317/31 |
| 3,946,761 | 3/1976 | Thompson et al. | 138/98 |

Primary Examiner—S. Clement Swisher
Attorney, Agent, or Firm—Floyd A. Gonzalez; John H. Tregoning

[57] ABSTRACT

A method and apparatus for testing and repairing a subsurface conduit using an inflatable packer, wherein the packer includes a fluid filled pressure responsive means, and a fluid pressure conductor means for transmitting fluid pressure to a pressure indicating means located on one end of the packer. The packer is positioned in the conduit such that the fluid filled pressure responsive means is adjacent that portion of the conduit to be tested. The packer is then inflated to isolate the conduit portion to be tested. Air pressure may then be introduced through means in the packer to the isolated conduit portion, and the pressure observed on the pressure indicating means by a television camera located in the subsurface conduit. The packer also includes means for injecting chemical grouting material into a leak in the isolated portion of the conduit.

8 Claims, 2 Drawing Figures

PACKER FOR TESTING AND GROUTING CONDUITS

BACKGROUND OF THE INVENTION

The present invention relates to a method and apparatus for testing and repairing a conduit. In particular, it relates to an inflatable packer operable for placing in a subsurface conduit, and for testing and repairing joints in the conduit.

In subsurface conduits, such as sewer lines, it is frequently necessary to repair leaking joints of the conduit. Packer assemblies have been known which may be used for isolating a leaking joint and for injecting a hardenable grouting material into the joint. These leaking joints are most advantageously located by the use of a television camera placed in the conduit with the packer. The television camera is used to visually locate leaks and to center the packer over the faulty joint such that the leak may be isolated and subsequently repaired with the grouting material.

This method is successful where the leaking joint may be easily determined by invading ground water or by an obvious defect in the joint. However, when a bad joint cannot be detected visually, it is desirable to pressure test each joint in the sewer line to locate those which are defective. The ability to pressure test each joint eliminates the necessity of grouting each joint to be sure that all leaking joints have been repaired.

Inflatable packers for pressure testing joints are known which may be placed over a joint to be tested and inflated to thereby isolate the joint. Air is then introduced into the isolated area and pressurized to a desired pressure. The air pressure in the isolated area is then monitored to determine if the air is dissipating through the joint thus indicating a leak.

It is also desirable to provide in the packer means for determining the hydrostatic pressure of ground water invading a subsurface conduit to determine the pressure needed to displace grouting material against this hydrostatic pressure to the joint to be repaired. It is also desirable to be able to pressure check the repaired joint to ensure that the grouting repair is successful and that the repaired joint will hold pressure.

Prior art packers have been constructed which include an electronic pressure sensor for determining the pressure in the isolated joint area. An electrical signal is then placed on an electrical conduit which leads from the packer to the surface. Such packers are expensive in that an electronic telemetering system is needed to transmit the electrical pressure signal to the surface and additional electronic equipment is needed to receive the electrical signal and convert it to a readable recording which may be monitored by the packer operator. The placing of electronic equipment in the packer is also undesirable because of the environment of the sewer line.

The packer of the present invention includes an inflatable means for isolating a portion of the conduit to be tested. Additionally, means are provided for applying fluid pressure to the isolated conduit portion.

The packer includes a fluid filled pressure responsive element adjacent the isolated conduit portion which transmits fluid pressure to one end of the packer through a fluid conductor located in the packer. A pressure indicating means is connected to the fluid conductor and is located such that the pressure indication may be viewed by the associated television camera. It can thus be seen that a greatly simplified packer results which indicates in the conduit the pressure in the isolated portion of the conduit. This pressure indication is viewed by a television camera which transmits the pressure indication to the surface with the picture of the conduit being inspected and repaired. This arrangement minimizes the number of electrical connections and electronic components necessary to monitor from the surface the desired pressure readings.

Since the fluid filled pressure responsive element is always subjected to fluid pressure in the isolated conduit portion, the packer of the present invention may be used to conduct pressure tests of conduit joints, measure hydrostatic pressure of invading ground water, and conduct pressure tests of the repaired joint.

DESCRIPTION OF THE PREFERRED EMBODIMENT

Figure 1:
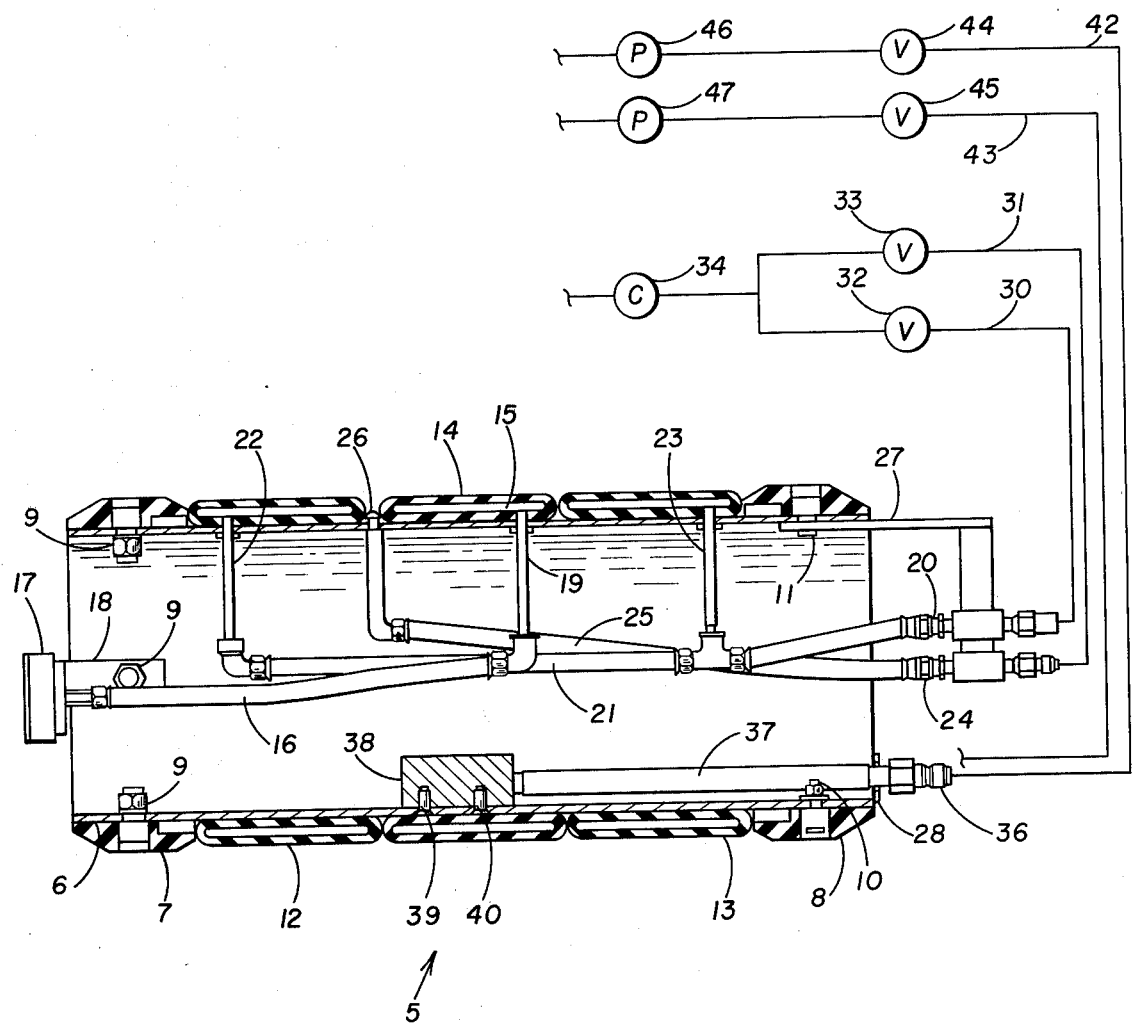
FIG. 1 is a cross-sectional view of the sleeve packer of the invention in its deflated condition, and includes a schematic representation of the air and chemical line connections.

FIG. 1 is a cross-sectional representation of a packer which incorporates the present invention, and includes a schematic diagram of the pneumatic and chemical system connections. The present invention is an improvement upon a packer for testing and grouting conduits such as the packer disclosed in the Telford et al U.S. Pat. No. 3,269,421 issued Aug. 30, 1966, the entire disclosure of which is hereby incorporated by reference.

FIG. 1 discloses a packer assembly 5 which includes a cylindrical sleeve body 6 having a guide shoe 7 bolted to one end thereby by a plurality of bolts 9, and having guide shoe 8 bolted to the opposite end thereof by bolts 10 and 11.

Located concentrically around tubular sleeve body 6 between guide shoes 7 and 8 are inflatable packer elements 12 and 13 and a center element 14 as shown. The interior 15 of center element 14 of the preferred embodiment is fluid filled. The preferred fluid medium is an incompressible fluid such as water. A flow conduit 16 connects through an appropriate nipple connector 19, the interior 15 of the center element 14 to a gauge 17 which is mounted to one end of the tubular sleeve housing 6 by a gauge mounting bracket 18.

At the other end of tubular sleeve body 6 is located a packer inflating air manifold 20 mounted to an air manifold bracket 27 which is in turn fastened to the sleeve body 6 by bolt 11. The air manifold 20 is connected by an air conduit 21 and appropriate nipple connectors 22 and 23 to the inflatable packer elements 12 and 13. It will be noted that the only connection between sleeve body 6 and inflatable packer element 12 and 13 are connectors 22 and 23. Likewise, center element 14 is connected to sleeve body 6 by connector 19.

Also mounted on air manifold bracket 27 is an air test connector 24 which is connected to an air test valve 26 by air conduit 25.

Shown schematically is flexible air hose 30 for inflating the packer elements 12 and 13 and flexible air hose 31 for conducting an air test through air test valve 26.

Lines 30 and 31 are connected to an air compressor 34 which supplies compressed air to the inflatable packer elements 12 and 13 and to the air test valve 26. Valve 32 controls the air supply to inflatable packer elements 12 and 13, while valve 33 controls the air supply for conducting an air test through air test valve 26.

A connector 36 for a chemical hose is attached to the sleeve 6 by a chemical connector bracket 28 as shown. Chemicals introduced through connector 36 are conducted to a chemical outlet fitting 38 by a chemical conduit 37. Chemical outlet fitting 38 is fastened to sleeve body 6 by threaded fasteners such as screws 39 and 40. Connector 36 and conduit 37 is one of a pair of chemical conduits which are arranged in a side-by-side relationship such that the second conduit is not shown in FIG. 1. Conduit 37 conducts a first grouting chemical which is discharged by an appropriate oulet in the chemical outlet fitting. The second conduit conducts a second grouting chemical which is discharged by a similar outlet in the chemical outlet fitting 38. The chemical outlet fitting 38 with its associated outlets may be constructed as shown in FIGS. 4 and 5 of the incorporated Telford et al U.S. Pat. No. 3,269,421.

Represented schematically in FIG. 1 is a first chemical hose 42 which provides the first grouting chemical to conduit 37. A second chemical hose 43 provides the second grouting chemical to the second chemical conductor. A valve 44 controls the flow of the first grouting chemical which is pumped by a pump 46. Likewise, a valve 45 controls the flow of a second grouting chemical supplied by a pump 47.

As set forth in the Telford et al patent, when it is desired to repair a sewer line using the present packer the center element 14 is positioned over the conduit leak and the inflatable packer elements 12 and 13 are inflated by opening valve 32. Grouting chemicals are then pumped by pumps 46 and 47 through valves 44 and 45 and through chemical hoses 42 and 43 and thence through the parallel chemical conductors in the packer to be discharged through the described chemical outlets in outlet fitting 38. The two grouting chemicals then are commingled in the annular space between the center element 14 and the sleeve body 6. The two mixed chemicals then are displaced from behind center element 14 through the spaces between the adjoining center element 14 and the inflated packer elements 12 and 13. However, contrary to the operation of the packer of the Telford et al patent, the center element 14 is not inflated but rather is used as a pressure responsive means for transmitting fluid pressure from the interior 15 of the center element 14 through the pressure conduit 16 to the pressure gauge 17. This arrangement, when used in conjunction with the pressure test valve 26, allows the packer of the present invention to be used not only as a grouting packer but also as a test packer for testing a conduit such as a sewer line.

Figure 2:
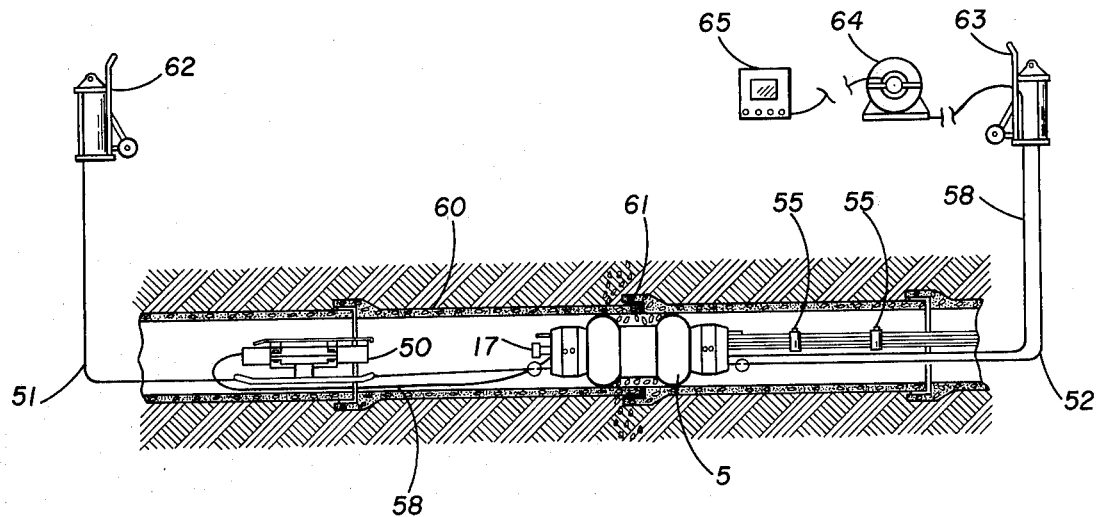
FIG. 2 is a cross-sectional view of a subsurface conduit having a television camera and the packer of the present invention disposed within the conduit, and further illustrates the packer in the inflated testing and grouting condition.

FIG. 2 illustrates the use of packer 5 of the present invention as a sewer line testing and grouting apparatus. The packer 5 is located in a sewer line conduit 60 with a television camera 50.

A particularly advantageous television camera is one having a silicon target vidicon suitable for use with low light levels such as is disclosed in U.S. Pat. No. 3,885,091. One such camera is the Model 80 TV camera sold by Halliburton Services of Duncan, Okla.

Such a camera, when used in the manner disclosed in U.S. Pat. No. 3,885,091 or when used with the light assembly of U.S. Pat. No. 3,943,410 or similar light source, is able to view the pressure gauge 17 such that the gauge pressure is easily readable without the hot spots, white outs, or light reflections which tend to blind a camera requiring levels of high illumination.

Using a gauge face having a dark background and white numerals is desirable, although not necessary, in that reflections and glare from the gauge background is reduced.

The television camera 50 and the packer 5 are manipulated by the use of cables 51 and 52 to move the camera 50 and packer 5 through the conduit 60 as a unit. This is normally done by reeling in cable 51 with winch 62 and playing out cable 52 from winch 63. Air hoses 30 and 31 and chemical hoses 42 and 43 are preferably bundled together by a manufacturing process, or may be bundled together by connecting straps 55 such that they can be trailed behind the packer 5 without becoming entangled.

A TV cable 58 for supplying power to the TV camera 50 and its associated lights, is trailed from the TV camera 50 through the central bore of the sleeve housing 6 of the packer assembly 5 and to the surface to a TV cable reel assembly 64. The picture, as viewed by the TV camera 50, is displayed on an appropriate TV monitor 65 and may be recorded, if desired, on an appropriate television tape recorder.

Referring both to FIGS. 1 and 2, the packer assembly is used in conjunction with the TV camera 50 as follows. The camera 50 and packer 5 are advanced through the sewer line conduit 60 until a joint 61 is located. The camera 50 and packer 5 are then advanced until the packer 5 is centered over the joint 61 to be tested.

Compressed air is then introduced into inflatable packer elements 12 and 13 by opening valve 32. When the packer elements 12 and 13 are fully inflated it will be seen that an annular cavity is created isolating the joint 61 to be tested. Valve 32 is then closed to trap the compressed air in packer elements 12 and 13. Test valve 33 is then opened which introduces compressed air through air test valve 26 and into the annular cavity surrounding joint 61. Air test valve 26 is preferably a check valve which will allow air to flow into the annular cavity only. As air pressure builds up in this annular cavity, the air pressure will be transmitted by the fluid in the interior 15 of center element 14 through pressure conduit 16 to the recording gauge 17 on the end of packer 5. The reading of gauge 17 will be viewed by the camera 50 which in turn can be read on the monitor 65 at the surface.

When the desired air pressure has been introduced into the annular cavity surrounding joint 61, valve 33 may be closed and the pressure gauge 17 may be observed to determine if the compressed air dissipates through joint 61. Also, the time required for the air pressure to dissipate may be measured to give an indication of the flow rate of a leak.

If this test indicates that joint 61 does leak and grouting is required, the grouting chemicals may be introduced into the annular cavity surrounding joint 61 and thence into joint 61 in the conventional manner through chemical hoses 42 and 43.

After the grouting chemicals have been allowed to harden, the inflatable packer elements 12 and 13 may be deflated and the camera 50 and packer 5 may be advanced down the sewer line conduit to the next joint to be tested.

In addition to the described air test, the present invention may be used to monitor the pressure of the grouting chemicals displaced into a conduit leak. Also, a pressure test may be conducted on the joint after the grouting chemicals have hardened to ensure that the repair is successful.

Many times a leak in the conduit will allow ground water to invade the conduit. In this situation the present invention may be used to measure the hydrostatic pressure of the invading ground water. The packer 5 is positioned over the leak visually located by the camera 50. The packer elements 12 and 13 are then inflated to isolate the leak. The pressure recorded on gauge 17 is then observed to obtain the hydrostatic pressure on the invading ground water.

It can thus be seen that the present invention provides a packer for testing and grouting conduits which is characterized by its simplicity and its reliability in providing an indication of the pressure surrounding an isolated portion of the conduit.

The present invention may be embodied in other specific forms without departing from the spirit or essential characteristics thereof. The presently disclosed embodiment is to be considered in all respects as illustrative, and not restrictive, the scope of the invention being indicated by the appended claims rather than by the foregoing description, and all changes which come within the meaning and range of equivalency of the claims are therefore intended to be embraced therein.

What is claimed is:

1. In a sleeve packer operable for testing and repairing subsurface conduits and having spaced apart inflatable end means for isolating a portion of a subsurface conduit to be tested, a normally expandable center element positioned between said spaced apart inflatable end means, and means for applying fluid pressure to said isolated portion, the improvement comprising:
    fluid pressure conduit means connected to said center element for conducting fluid pressure from said center element to one end of said sleeve packer;
    pressure indicating means located on said one end of said sleeve packer and connected to said fluid pressure conduit for visually indicating the fluid pressure in said fluid pressure conduit means and said connected center element; and
    pressure transmitting fluid located in said center element and said fluid pressure conduit means, and deploying said center element for filling the space between said spaced apart inflatable end means and for presenting a pressure responsive surface to a portion of a subsurface conduit isolated by said inflatable end means.

2. The packer of claim 1 wherein said pressure transmitting fluid is an incompressible liquid.

3. The packer of claim 2 further comprising means operable for injecting grouting material between the sleeve packer and the isolated portion of said conduit to repair a leak in the portion of said conduit to be isolated.

4. In an apparatus operable for testing and repairing a subsurface pipeline and having: a cylindrical sleeve packer including spaced apart inflatable end means for isolating a portion of a subsurface pipeline to be tested, a normally expandable center element positioned between said spaced apart inflatable end means, and means for applying fluid pressure to said isolated portion; and
    a television camera in said pipeline for locating leaks in the walls of said pipeline, and for positioning said sleeve packer over said located leaks;
the improvement comprising:
    fluid pressure conduit means connected to said center element of said sleeve packer for conducting fluid pressure from said center element to one end of said sleeve packer, said end being in the view of said television camera;
    pressure indicating means located on said one end of said sleeve packer and connected to said fluid pressure conduit for visually indicating the fluid pressure in said fluid pressure conduit means and said connected center element, said fluid pressure indication being visible to said television camera; and
    pressure transmitting fluid located in said center element and said fluid pressure conduit means, and deploying said center element for filling the space between said spaced apart inflatable end means and for presenting a pressure responsive surface to a portion of a subsurface conduit isolated by said inflatable end means.

5. The apparatus of claim 4 further comprising pressure testing means within said sleeve body and operable from the surface for applying fluid pressure radially outwardly from said sleeve body to that portion of the conduit isolated by said inflatable means.

6. The apparatus of claim 5 wherein said pressure transmitting fluid is an incompressible liquid.

7. The apparatus of claim 5 further comprising means operable from the surface for injecting grouting material radially outwardly from said sleeve body to that portion of the conduit isolated by said inflatable means for repairing a leak in the isolated portion of said conduit.

8. The apparatus of claim 7 further comprising monitor means for electronically reproducing the view of said television camera including said pressure indicating means viewed by said television camera.

* * * * *